United States Patent
Su

(10) Patent No.: US 10,881,121 B2
(45) Date of Patent: Jan. 5, 2021

(54) COOKING-CONVEYING-BATCHING APPARATUS

(71) Applicant: Fusheng Su, Wuhan (CN)

(72) Inventor: Fusheng Su, Wuhan (CN)

( * ) Notice: Subject to any disclaimer, the term of this patent is extended or adjusted under 35 U.S.C. 154(b) by 185 days.

(21) Appl. No.: 16/160,469

(22) Filed: Oct. 15, 2018

(65) Prior Publication Data

US 2019/0110639 A1 Apr. 18, 2019

(51) Int. Cl.
*A47J 37/12* (2006.01)
*A23L 5/10* (2016.01)

(52) U.S. Cl.
CPC .......... *A23L 5/15* (2016.08); *A47J 37/1214* (2013.01); *A47J 37/1219* (2013.01)

(58) Field of Classification Search
CPC .... A47J 37/1219; A47J 37/1214; A47J 37/12; A47J 37/1228
USPC .............................. 99/407, 404, 416, 443 C
See application file for complete search history.

(56) References Cited

U.S. PATENT DOCUMENTS

| | | | | |
|---|---|---|---|---|
| 1,394,612 A | * | 10/1921 | Dernell | A47J 37/1219 99/414 |
| 4,619,189 A | * | 10/1986 | Kou | A21C 11/22 425/376.1 |
| 4,685,386 A | * | 8/1987 | Bezon | A47J 27/18 99/404 |
| 4,979,435 A | * | 12/1990 | Hayashi | A47J 27/18 99/334 |
| 5,228,382 A | * | 7/1993 | Hayashi | A47J 27/18 99/328 |
| 5,901,640 A | * | 5/1999 | Castlebury | A47J 37/1228 99/330 |

* cited by examiner

*Primary Examiner* — Reginald Alexander
(74) *Attorney, Agent, or Firm* — Saliwanchik, Lloyd & Eisenschenk

(57) ABSTRACT

A cooking-conveying-batching apparatus for automatic cooking and food production. It uses the principle of rotation to cook, convey and formulate batching. Cooking containers are rotated by a curved bevel track that lowers the cooking containers into a heat source cooker. At the end of the cooking process the cooking containers are raised and rotate to deposit the cooked food into conveying containers. The conveying containers rotate towards a batching container that deposits ingredients into the food-containing conveying containers.

20 Claims, 4 Drawing Sheets

COOKING-CONVEYING-BATCHING APPARATUS

CROSS-REFERENCE TO A RELATED APPLICATION

This application claims priority under 35 U.S.C. § 119(e) of Chinese Patent Application No. 201710967486.X, filed Oct. 16, 2017, which is incorporated herein by reference in its entirety.

BACKGROUND OF THE INVENTION

The kitchen cooking machines on the market today are typically limited to the preparation and processing of batches. Cooking machines for batch processing are further limited in that they still require significant manual assistance. None of them integrate into an automated process the steps of cooking food in one container, transferring the cooked food to a holding container, and applying to the cooked food a batch formulation, which can be, for example, seasoning, preservatives, colorants, food additives, or other products. The current invention provides a cooking-conveying-batching apparatus that reduces the need for manpower, improves work efficiency, reduces production cost, and reduces the probability of disease transmission caused by manual cooking.

BRIEF SUMMARY OF THE INVENTION

Embodiments of the subject invention provide an automated cooking-conveying, batch formulation apparatus. It can be used in the field of automated cooking machines, for supporting the batch production of cooked food products. In one embodiment, the apparatus uses a circular assembly line process that employs multiple containers to cook, convey and apply a batch formulation, which solves the disadvantages of low efficiency due to manual operation. It also reduces the spread of disease caused by manual cooking procedures.

DETAILED DESCRIPTION OF THE INVENTION

In accordance with embodiments of the subject invention, the problem of automated batch cooking apparatuses requiring at least some manual intervention or assistance is solved by using a cooking-conveying-batching apparatus 100 that minimizes the need for manual assistance in batch preparation of a food product. The apparatus of the subject invention can convey a raw or uncooked food product through an automated cooking process and a subsequent batch formulation process with minimal or no manual assistance.

Embodiments of the subject invention comprise cooking containers, conveying containers, batching containers, curved bevel tracks, heat source cookers, motors, food main containers, conveyor belts, cooking container drive shafts, conveying container rotating shafts, batching container rotating shafts, cooking container power belts, conveying container power belts, batching container power belts, and rotating knives. Advantageously, it uses the principle of rotation with a circular conveyor system, whereby at least one cooking container 1, connected by a cooking container connecting rod 25 to a cooking container drive shaft 19, is continuously rotated to cook a batch of a food product and deposit a batch formulation on each batch of the cooked food product. Alternatively, there can be a plurality of cooking containers attached by a plurality of cooking container connecting rods to the cooking container drive shaft, which are continuously rotated to cook multiple batches of food.

Figure 1:
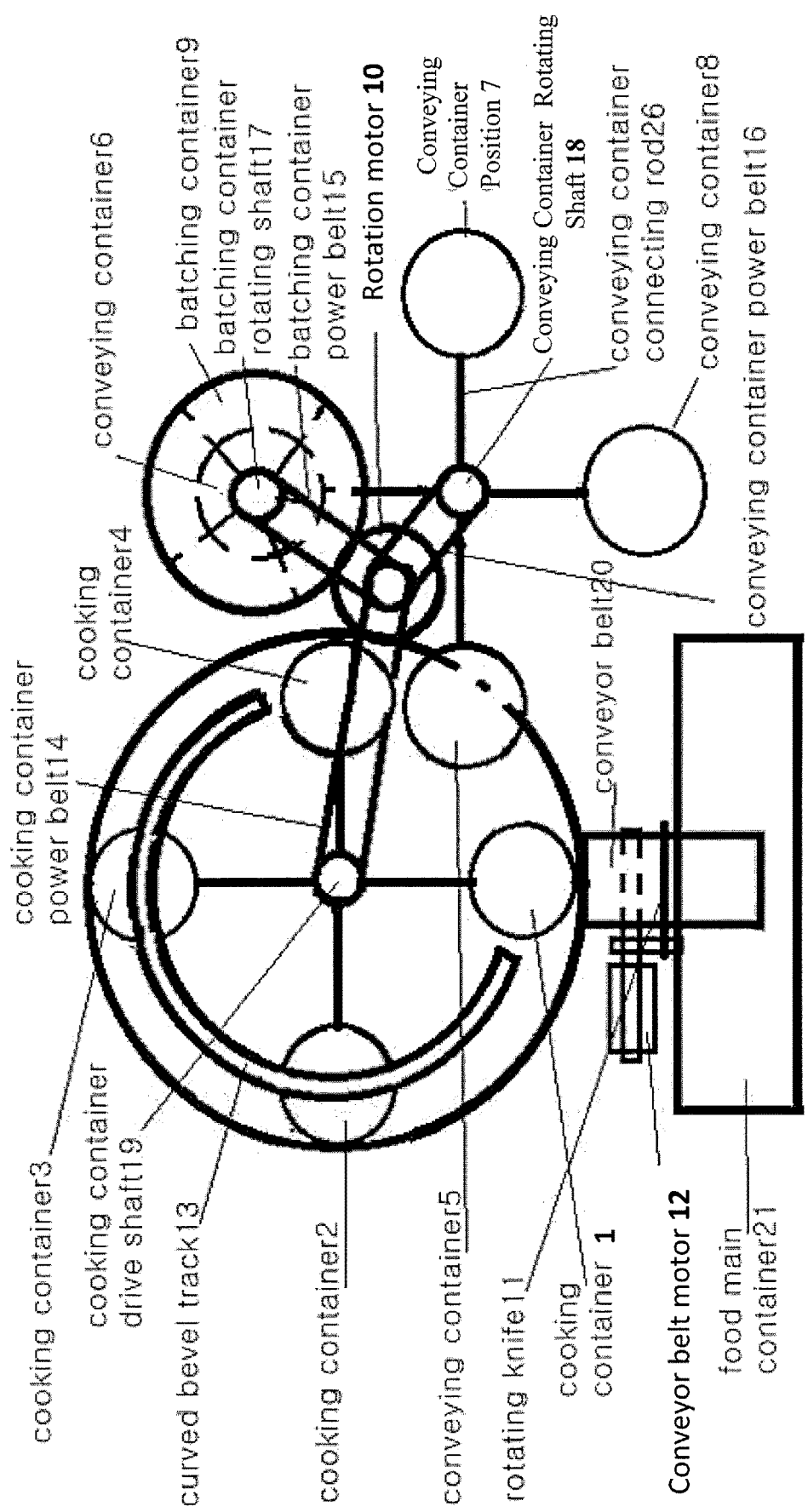
FIG. 1 is a schematic from a top plan view showing of an embodiment of the automated cooking, conveying and batching apparatus, according to the subject invention.

The cooking process can be initiated by preparing and depositing the food product in a cooking container 1. In one embodiment, a rotary knife 11 cuts a food product as it exits a food main container 21 and deposits the cut food into a cooking container 1 by use of a conveyor belt 20. An example of this is shown in FIG. 1. A rotation motor 10 can rotate the cooking container drive shaft 19 by attachment to a cooking container power belt 14 to advance the cooking container 1. The plurality of cooking containers 1 can have cooking container connector rods 25 that operably connect them to the cooking container drive shaft 19.

In one embodiment, the cooking containers are attached to lifting rods 22, where at top end of the lifting rods are operably connected to a curved bevel track 13. In one embodiment, the cooking containers are rotatably attached to the lifting rod, so that cooking containers can be tipped over to pour out or convey the contents therein. In a further embodiment, the cooking containers are removable from the lifting rods so that different types of cooking containers can be used on the lifting rods.

Figure 2:
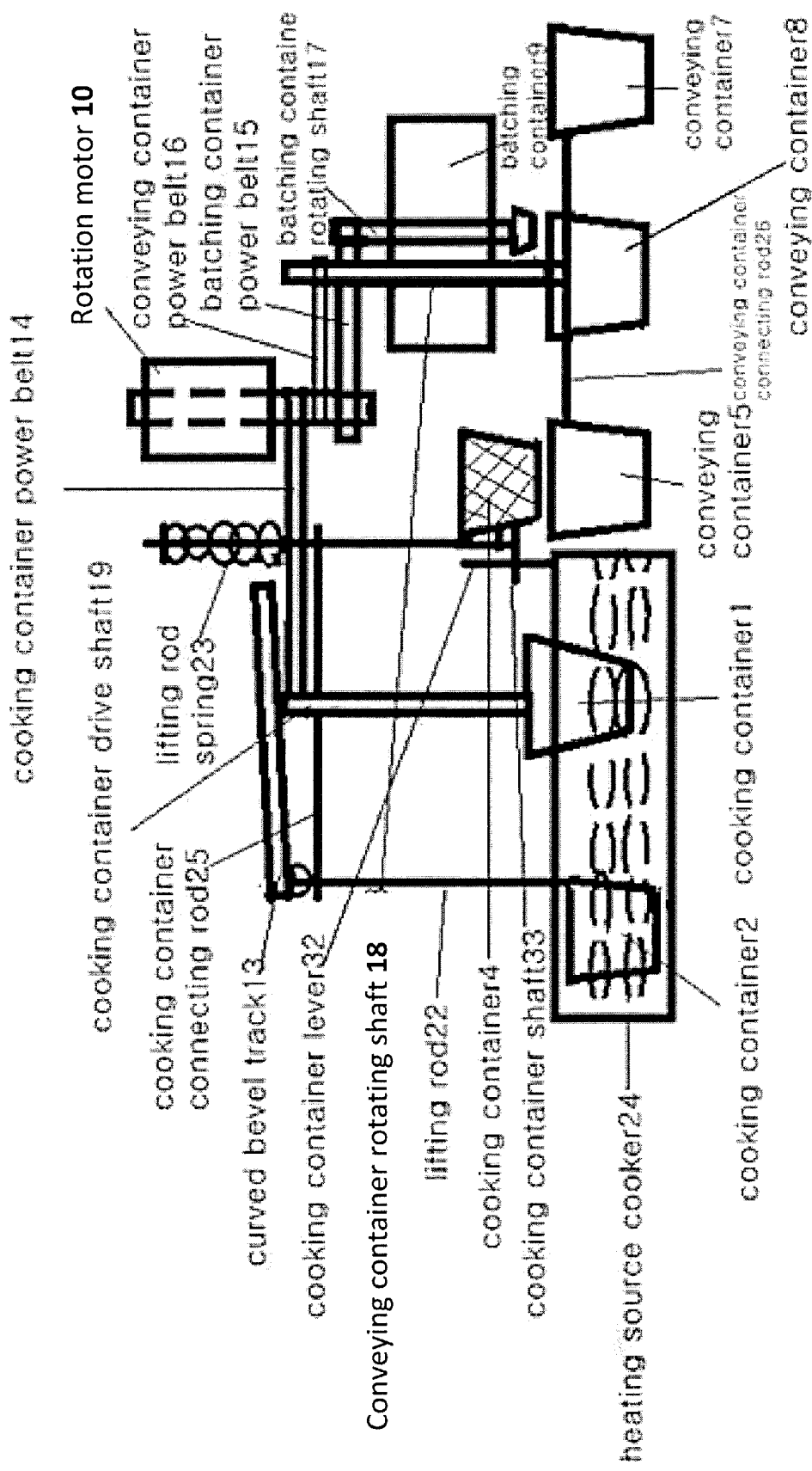
FIG. 2 is a schematic from a front elevation view showing an embodiment of the automated cooking, conveying, and batching apparatus, according to the subject invention.

As the top end of the lifting rod 22 rotates in the curved bevel track 13, which has one side lower than another side. The height of the cooking container 1 is lowered by the curved bevel track 13 to make it come into contact with the heat source cooker 24 required for cooking. FIG. 2 illustrates an example of how the cooking container is lowered into contact with a heat source cooker, where the curved bevel track is lower on one side.

In one embodiment, a rotation motor 10, of the cooking-conveying-batching apparatus 100, advances the plurality of cooking containers 1 through various positions by operable connection to a cooking container power belt 14. The plurality of cooking containers can move in a clockwise direction and the lifting rod 22 operably attached to a cooking container 1 and a curved bevel track 13 can lower the height of the cooking containers by the operable attachment to the curved bevel track. By lowering the cooking containers, they come into contact with at least one heat source cooker 24 and continue to move, for example, in a clockwise direction, along the curved bevel track 13.

Figure 4:
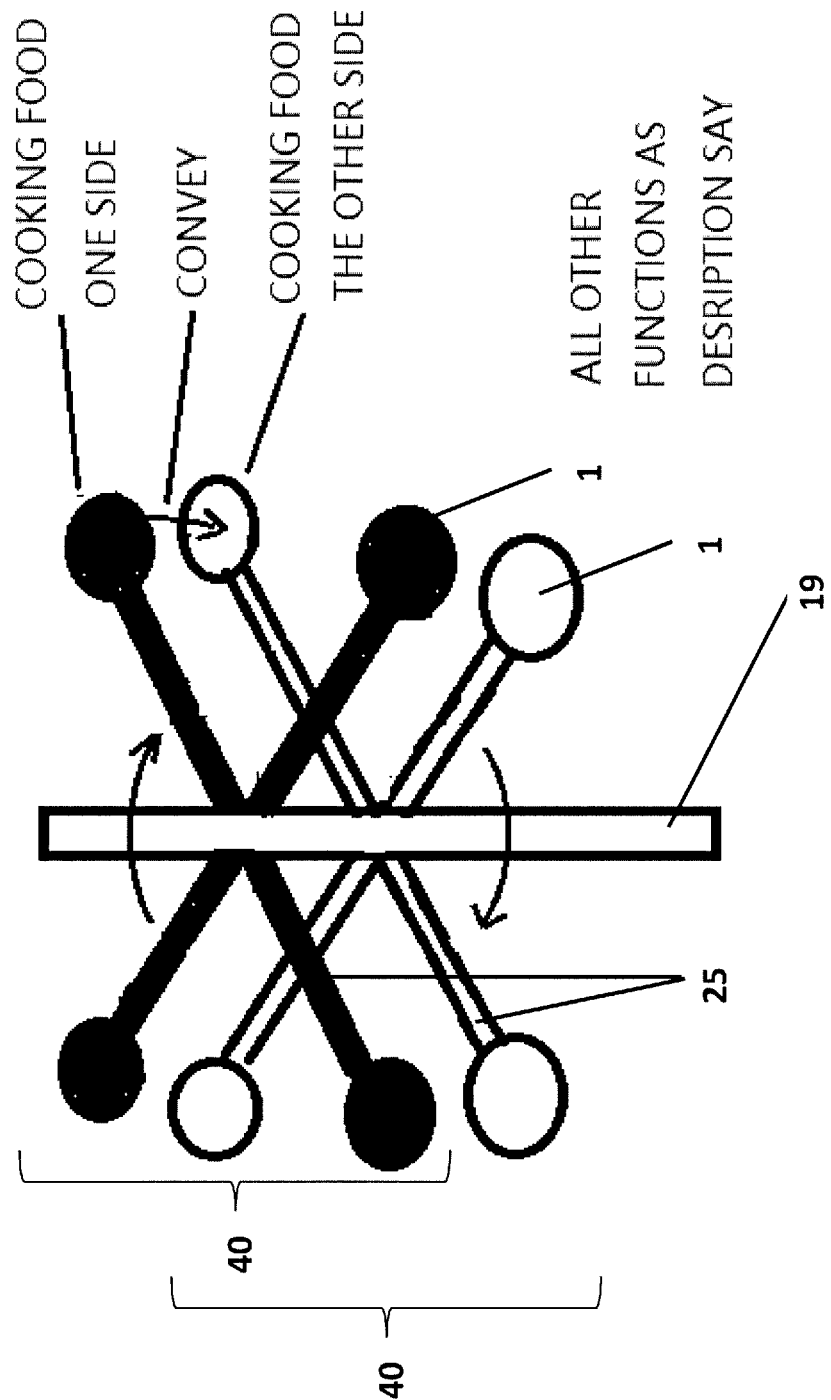
FIG. 4 illustrates one embodiment of different levels of cooking containers used with the cooking-conveying-batching apparatus of the subject invention.

In an alternative embodiment, there can be multiple levels 40 of cooking containers. FIG. 4 illustrates a non-limiting example of a cooking container drive shaft 19 on which multiple cooking containers are vertically attached by connector rods 25 to the cooking container drive shaft 22, so that there is at least one level 40 of cooking containers above another level 40 of cooking containers. With this embodiment, the lifting rod can be shortened to accommodate the different levels. In a particular embodiment, the cooking containers are operably attached to the connector rods, without using a lifting rod, such as shown, for example in FIG. 4.

The cooking containers in each level can be vertically or approximately vertically arranged with the cooking containers in another level, such that they are above each other. With this embodiment, multiple containers can come into contact with the heat source cooker 24 at the same time, wherein one group of vertical containers can come into contact with the heat source cooker followed by another group. Alternatively, the food in a cooking container at one level can be cooked by the heat source cooker and the cooked food be transferred or conveyed to a cooking container arranged below it to be cooked again or cooked further in the heat source cooker. By way of example, a food product in cooking containers in one level can come into contact with the heat source cooker 24, which can cook one side of the food product. The food product can then be conveyed, such as by tipping or opening one cooking container to a lower cooking container. In one embodiment, the cooking containers at each level are different types of containers. The food product in a lower level cooking container can continue rotation to come into contact again with the heat source cooker to cook the food product again or cook another side of the food product or otherwise recook the food product.

Alternatively, the levels of cooking containers can be arranged so that they are offset and are not vertically arranged above one another. With this embodiment, the cooking containers on alternate levels can come into contact with the heat source cooker 24. In another embodiment, there is more than one heat source cooker. The cooking containers at each level can rotate into contact with a different heat source cooker arranged at each level 40. In a further embodiment, the food at one level can be cooked in one way or at one temperature, tipped into a lower cooking container and rotate into contact with a different heat source cooker to cook the food in a different way or at a different temperature. As mentioned above, there can be different types of cooking container at each level.

When the cooking container 1 moves into position of the cooking container 4, as shown on FIG. 1, the cooking container 1 and the lifting rod 22 can be temporarily separated from the curved bevel track 13. The cooking container 1 can be pulled upward by a lifting rod spring 23 at the top end of the lifting rod when the cooking process is complete. In one embodiment, the cooking container has a heating function, such as, for example, heating elements, to maintain the food at a preferred temperature.

When the cooking process is complete and the cooking container has been pulled upward by the lifting rod spring 23, a cooking container shaft 33 on the cooking container 1, such as shown, for example, in FIG. 2, can contact a cooking container lever 32, positioned to raise and push or tip over the cooking container 1, as shown by way of example in FIG. 2, to pour the cooked food into a conveying container 5.

In one embodiment, the conveying container 5 has a heating function, such as, for example, heating elements, to maintain the food at a preferred temperature. In another embodiment, the conveying system rotates horizontally, such as shown in FIGS. 1 and 2. The conveying container 5, after receiving a batch of cooked food from the cooking container 1, is moved to the position 6, beneath a batching container 9, seen on FIG. 1, by a batching container rotating shaft 17 being rotated by a batching container power belt 15 operably connected to the rotation motor 10. The batching container can contain ingredients or formulations to be added to the cooked food in the cooking container 6 position.

In one embodiment, the batch container is a single or unitary container with one section or space for holding the batch formulation. In an alternative embodiment, the batching container is divided into more than one space or section for containing more than one ingredient or batch formulation. In another alternative embodiment, the batch container is multiple containers. A batch formulation can be, for example, seasoning, preservatives, colorants, food additives, or other products, applied or added to the cooked food product.

Figures 3A, 3B:
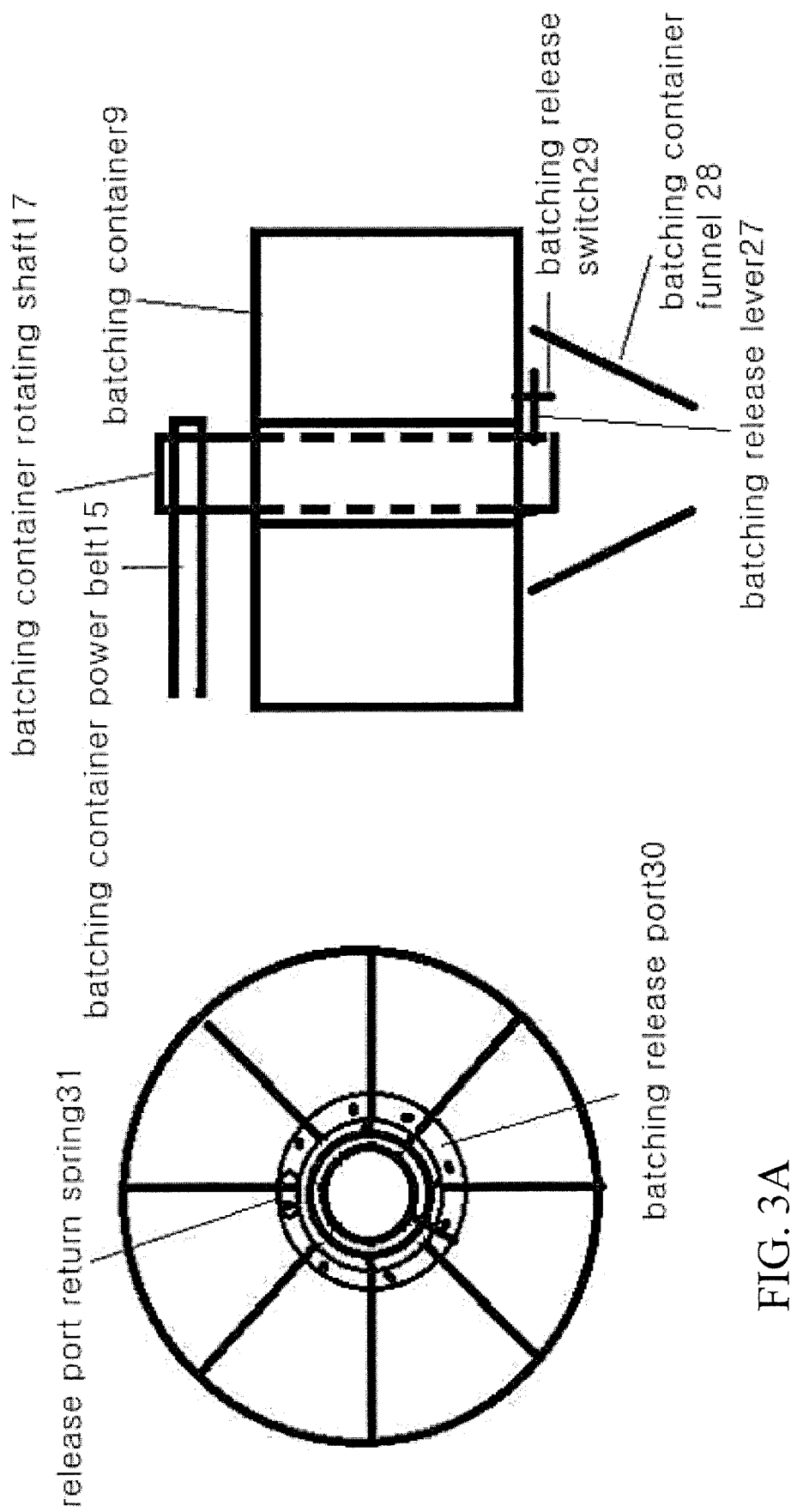
FIG. 3A is a schematic from a top plan view showing an embodiment of a batching container, according to the subject invention.
FIG. 3B shows a schematic from a front elevation view of a batching container, according to the subject invention.

It can be seen in FIG. 3 that there can be a batching release switch 29 on the batching container that is triggered by a batching release lever 27, so that the ingredients in the batching container 9 drop into the conveying container 5 beneath the batch container, through a batching release port 30 and into a batching container funnel 28. A release port spring 31 can automatically close the release port after a pre-determined amount of formulation has been released. Where there are multiple formulations or ingredients in different containers, they can be released simultaneously into the conveying container 5 at position 6 or they can be released at different times. Thus, multiple batching containers can release ingredients completed in one operation or multiple times.

In one embodiment, the cooking containers, the conveying containers, and the batching container use one cooking container within one radius of the rotation. Alternatively, there can be multiple cooking containers within one radius of the rotation. The system of cooking containers 1, the system of conveying containers 5, and the heating source cooker 24 can be one unitary component. Alternative, the system of cooking containers 1, the system of conveying containers 5, and the heating source cooker 24 can be a plurality of separate components.

With the combined operation of the cooking container, the conveying container, and the batching container, being advance by a cooking-conveying-batching apparatus 100 the cooking, delivery and batching are completed automatically, minimizing manual handling of the food.

Example 1: Specific Implementation

The process, as shown in FIG. 1, can be initiated by a conveyor belt motor 12 that drives a conveyor belt 20. A rotary knife 11 cuts food as it exits from the food main container 21. The food can be deposited into a cooking container 1 by the motion of the conveyor belt 20, seen in FIG. 1. The rotation motor 10 can drive a cooking container drive shaft 19 in synchrony with the conveyor belt motor 12. The plurality of cooking containers, 1, 2, 3 and 4, as shown in FIGS. 1 and 2, can each be attached to a cooking container connecting rod 25 that is further connected to a cooking container drive shaft 19. The rotation motor can advance the cooking container 1 after food is deposited therein, such as, for example, in a clockwise direction, by the cooking container power belt 14 that operably connects the rotation motor 10 to the cooking container drive shaft 19.

As container 1 advances, container 2 moves into position by the conveyor belt to receive cut food and then advances to move container 3 and subsequently container 4 in place to receive cut food, which is illustrated in FIGS. 1 and 2. At the same time, as the cooking container advances, the top of the lifting rod 22 can rotate into the curved bevel track 13, and the height of the cooking container 1 can be lowered by the curved bevel track 13, as illustrated in FIG. 2, to put it in contact with the heat source cooker 24 required for cooking the food therein. The cooking container 1, and each subsequent cooking container 2, 3, 4 that follows, can also be driven by the cooking container drive shaft 19 to run continuously in, for example, a clockwise direction. When advancing towards the cooking container 3, the food in the cooking container, completes the required cycle for cooking. At the end of the cooking cycle, the lifting rod 22 can be separated from the curved bevel track 13 and the lifting rod spring 23, on the lifting rod, raises the cooking container 1 in time to remove the cooking container 1 from the heat source cooker 24. At that point, the cooking process can be completed.

When the cooking container 1 moves to the cooking container 4 position, a cooking container shaft 33 on the outside of the cooking container (as seen in FIG. 2) can be toggled or moved by the cooking container lever 32 to invert or tip the cooking container 1 to achieve the purpose of pouring the cooked food in the cooking container 1 into a plurality conveying containers 5. In one embodiment, a plurality of conveying containers are radially attached to a conveying container rotating shaft 18, as shown in FIG. 1.

A conveying container 5 having received the cooked food from the cooking container 5 can be driven in a clockwise direction by the conveying container rotating shaft 18, operated by the rotating motor 10. When the conveying container 5 moves to the conveying container 6 position, shown in FIG. 1, the conveying container can be beneath a batching container. A batch container rotating shaft 17 can be operably connected to the rotating motor by a batching container power belt 15. When conveying container 6 is in position, the batch container rotating shaft 17 can start to rotate under the drive of the rotating motor 10, and a batching release lever 27 opens the batching release switch 29 (see FIG. 3), and a batch formulation within the batch container 9 drops into the conveying container 5 through a batching container funnel 28 to complete the procedure of batching addition. A batch formulation can be, for example, seasoning, preservatives, colorants, food additives, or other products, applied or added to the cooked food product Finally, the conveying container 5 having received the batching addition is again driven by the conveying container rotating shaft 18 to the conveying container 7 position, shown in FIG. 1. At container 7 position, the conveyor container containing the finished food material can be manually disengaged and taken away. Thus, the entire cooking, conveying, and batching process is completed. In a final step, when the conveying container 5 moves to the conveying container 8 position, an empty conveying container can be engaged in that position. The entire cooking, conveying, batching and putting vacant container procedures are all completed.

What is claimed:

1. A system, configured for cooked food production, comprising:
   a food main container, configured to hold a food product;
      a conveyor belt for transferring the food product away from the food main container;
      at least one cooking container having operably connected thereto a lifting rod with a spring, a cooking container connecting rod, and a cooking container shaft, wherein the conveyor belt transfers the food product to the cooking container;
      a cooking container drive shaft to which the cooking container connecting rod is operably connected;
      a rotation motor operably connected to the cooking container drive shaft by a cooking container drive belt that rotates the cooking container drive shaft and the cooking containers attached thereto;
      a curved bevel track in which the lifting rod and spring, on the at least one cooking container, engage to lower the cooking container as it advances along the curved bevel track and wherein the spring raises the cooking container as the lifting rod approaches an end of the curved bevel track;
      at least one heat source cooker, configured to cook the food product, into which the at least one cooking container is lowered as it advances along the curved track,
   wherein the cooking container can be rotated on the curved bevel track so that the food product therein is lowered closer to the heat source cooker and subsequently raised away from the heat source cooker when finished cooking;
   at least one conveying container, configured to receive the cooked food product from the cooking container, having operably connected thereto a conveying container connecting rod that contacts an operably positioned cooking container lever so as to cause the cooking container to deposit the cooked food product into the conveying container;
   a conveying container power belt that rotatably connects the conveying container connecting rod to the rotation motor to rotate the conveying container connecting rod and the conveying containers attached thereto;
   at least one batch container, configured to contain a batch formulation, comprising a batching release switch that opens a batching release port to release a pre-determined amount of the batch formulation and a release port spring that closes the batching release port;
   a batching container rotating shaft with a batching release lever that operably contacts the batching release switch;
   a batching container power belt that connects the batching container rotating shaft to the rotation motor to rotate the batching container rotating shaft and the batching release lever thereon so as to open the batching release switch to release the pre-determined amount of batch formulation into the conveying container containing the cooked food.

2. The system according to claim 1, wherein the cooking container drive shaft has two or more levels of containers attached thereon.

3. The system according to claim 2, wherein the cooking containers in one level are vertically arranged with the cooking containers in another level.

4. The system according to claim 2, wherein the cooking containers in one level are offset from the cooking containers in another level.

5. The system according to claim 2, further comprising more than one heat source cooker.

6. The system according to claim 1, wherein the rotation motor rotates the cooking container drive shaft in a counter clockwise direction.

7. The system according to claim 1, wherein the batching container comprises multiple sections for holding batch formulations.

8. The system according to claim 1 wherein the multiple sections release the batch formulations at different times.

9. The system according to claim 1, further comprising a curved bevel track in which the lifting rod and spring, on the at least one cooking container, engage to lower the cooking container as it advances along the curved bevel track and wherein the spring raises the cooking container as the lifting rod approaches an end of the curved bevel track.

10. The system according to claim 1, further comprising a heating function on the one or more cooking containers.

11. The system according to claim 1, further comprising a heating function on the one or more conveying containers.

12. The system according to claim 1, wherein the cooking containers are removeable and interchangeable with other cooking containers.

13. A method for cooking a food product utilizing a system, according to claim 1, comprising:
depositing a food product onto a conveyor belt;
transporting the food product to a cooking container, operably connected to and rotatable on the curved bevel track;
rotating the cooking container on the curved bevel track so that the food product therein is lowered into contact with a heat source cooker;
rotating the cooking container through at least one heat source cooker;
raising the cooking container out of contact with the heat source cooker;
rotating the cooking container into proximity with a conveying container;
tipping the cooking container, as it rotates into proximity with the conveying, container so that the cooked food product is deposited to the conveying container;
rotating the cooked food product into proximity with a batching container;
triggering the batching container to deposit a batch formulation onto the cooked food product as the conveying container comes into proximity with the batching container;
rotating the conveying container further to be out of proximity with the batching container; and
removing the conveying container.

14. The method according to claim 13, further comprising a rotating knife in operable contact with the conveyor belt, wherein the method further comprises cutting or chopping the food product prior to deposit in the cooking container.

15. The method according to claim 13, wherein more than one type of cooking container is attached to the cooking container drive shaft.

16. The method according to claim 13, wherein the cooking container drive shaft has two or more levels of containers attached thereon.

17. The method according to claim 16, wherein the cooking containers in one level are vertically arranged with the cooking containers in another level and the method further comprises rotating vertically arranged cooking containers through a heat source cooker.

18. The system according to claim 2, wherein the cooking containers in one level are offset from the cooking containers in another level.

19. The system according to claim 18, wherein the cooking containers at different levels rotate into contact with different heat source cookers.

20. The system according to claim 2, further comprising more than one heat source cooker.

* * * * *